United States Patent
Li et al.

(10) Patent No.: US 10,794,505 B2
(45) Date of Patent: Oct. 6, 2020

(54) SPRING SEAT FOR AN INTERNAL VALVE

(71) Applicant: EMERSON PROCESS MANAGEMENT REGULATOR TECHNOLOGIES, INC., McKinney, TX (US)

(72) Inventors: Li Li, Shanghai (CN); Jing Chen, Shanghai (CN); Fei Fei Ji, Shanghai (CN); Shao Lijing, Shanghai (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 132 days.

(21) Appl. No.: 15/635,904

(22) Filed: Jun. 28, 2017

(65) Prior Publication Data

US 2018/0259079 A1 Sep. 13, 2018

(30) Foreign Application Priority Data

Mar. 10, 2017 (CN) .......................... 2017 1 0142427
Mar. 10, 2017 (CN) ...................... 2017 2 0235730 U (51) Int. Cl.
*F16K 17/04* (2006.01)
*F16K 31/524* (2006.01)
(Continued)

(52) U.S. Cl.
CPC .............. *F16K 17/048* (2013.01); *F16K 1/30* (2013.01); *F16K 17/30* (2013.01); *F16K 31/52408* (2013.01); *F16K 39/024* (2013.01)

(58) Field of Classification Search
CPC .......... F16K 17/048; F16K 17/30; F16K 1/30; F16K 39/024; F16K 31/52408
See application file for complete search history.

(56) References Cited

U.S. PATENT DOCUMENTS

| 1,652,510 A | 12/1927 | Allen |
| 2,226,843 A | 12/1940 | Carlson |

(Continued)

FOREIGN PATENT DOCUMENTS

| EP | 2 334 965 B1 | 10/2015 |
| JP | S48-73321 U | 9/1973 |

OTHER PUBLICATIONS

International Search Report and Written Opinion for Application No. PCT/US2018/018925, dated Jun. 7, 2018.

(Continued)

*Primary Examiner* — William M McCalister
(74) *Attorney, Agent, or Firm* — Marshall, Gerstein & Borun LLP (57) ABSTRACT

An internal valve including a valve body, a poppet valve coupled to the valve body, a bleed valve, a stem slidably disposed in the valve body and operatively coupled to the bleed valve. The stem is shiftable from a first position wherein the poppet valve and the bleed valve are both closed, to a second position wherein the bleed valve is open, and a third position wherein the bleed valve is closed, the poppet valve is open, and the poppet valve may shift toward the closed position and the bleed valve may open in response to a pressure change. A spring seat is coupled to the stem via a retaining feature such that the spring seat is movably disposed in the valve body, and a spring is operatively coupled to the stem via the spring seat and configured to bias the stem toward the first position.

20 Claims, 10 Drawing Sheets (51) Int. Cl.
*F16K 17/30* (2006.01)
*F16K 1/30* (2006.01)
*F16K 39/02* (2006.01)

(56) References Cited

U.S. PATENT DOCUMENTS

| | | | |
|---|---|---|---|
| 2,258,230 A | 10/1941 | Warren | |
| 2,347,158 A | 4/1944 | Spraragen | |
| 2,526,346 A | 10/1950 | Goldinger | |
| 2,630,137 A * | 3/1953 | Krone | F16K 17/30 137/413 |
| 2,904,074 A * | 9/1959 | Towler | B30B 15/186 137/614.17 |
| 2,926,690 A * | 3/1960 | Martin | F16K 17/20 137/460 |
| 3,078,875 A | 2/1963 | Farrell et al. | |
| 3,144,003 A | 8/1964 | Jacobs | |
| 3,164,359 A | 1/1965 | Dyer et al. | |
| 3,199,534 A | 8/1965 | Shaw et al. | |
| 3,285,288 A | 11/1966 | Irwin et al. | |
| 3,599,931 A | 8/1971 | Hanson | |
| 3,631,893 A * | 1/1972 | Seaman | F16K 17/168 137/517 |
| 3,631,894 A * | 1/1972 | Frantz | F02N 7/08 137/630.15 |
| 3,844,312 A * | 10/1974 | Sumner | F16K 17/30 137/460 |
| 5,848,608 A * | 12/1998 | Ishigaki | F16K 31/1225 137/599.16 |
| 6,109,302 A * | 8/2000 | Bircann | F16K 11/044 137/625.5 |
| 6,854,705 B2 * | 2/2005 | Wieder | F16K 31/122 251/62 |
| 8,256,462 B2 * | 9/2012 | Lin | F16K 1/385 137/630 |
| 8,262,057 B2 * | 9/2012 | Lin | F16K 27/07 137/460 |
| 8,353,310 B2 | 1/2013 | Lin et al. | |
| 8,459,288 B2 * | 6/2013 | Ishikawa | G05D 16/163 137/15.19 |
| 8,517,046 B2 * | 8/2013 | Lin | F16K 1/385 137/329.02 |
| 9,476,518 B2 * | 10/2016 | Blanchard | F16K 31/524 |
| 2006/0266962 A1 * | 11/2006 | Kanzaka | F16K 1/48 251/63.6 |
| 2008/0308161 A1 | 12/2008 | Lin et al. | |
| 2010/0084594 A1 | 4/2010 | Lin et al. | |
| 2011/0203685 A1 * | 8/2011 | Lin | F16K 37/0008 137/553 |
| 2013/0056666 A1 * | 3/2013 | Lin | F16K 1/126 251/291 |
| 2015/0129791 A1 * | 5/2015 | Okita | F16K 7/14 251/331 |

OTHER PUBLICATIONS

International Search Report and Written Opinion for Application No. PCT/US2018/018933, dated Jun. 7, 2018.
International Search Report and Written Opinion for Application No. PCT/US2018/018940, dated Jun. 5, 2018.
International Search Report and Written Opinion for Application No. PCT/US2018/019157, dated Jun. 8, 2018.
International Search Report and Written Opinion for Application No. PCT/US2018/019162, dated Jun. 5, 2018.
Emerson Process Management, Types C471 and C477 Jet Bleed Internal$^{TM}$ Valves, Bulletin LP-7:C471/C477, 8 pages, Sep. 2012, United States.
Emerson Process Management, Types C471, C477 and C486 Internal Valves; Types C471, C477 and C486, 16 pages., Oct. 2015, United States.
U.S. Office Action for U.S. Appl. No. 15/636,492, dated Apr. 24, 2019.
U.S. Office Action for U.S. Appl. No. 15/635,708, dated Apr. 16, 2019.
U.S. Office Action for U.S. Appl. No. 15/363,492, dated Jan. 3, 2019.
U.S. Office Action for U.S. Appl. No. 15/636,507, dated Dec. 28, 2018.
U.S. Office Action for U.S. Appl. No. 15/636,507, dated Jan. 24, 2019.
U.S. Office Action for U.S. Appl. No. 15/635,914, dated Sep. 10, 2018.
U.S. Office Action for U.S. Appl. No. 15/363,492, dated Sep. 6, 2018.
U.S. Office Action for U.S. Appl. No. 15/636,492, dated Feb. 23, 2018.
U.S. Office Action for U.S. Appl. No. 15/635,914, dated Feb. 23, 2018.
U.S. Office Action for U.S. Appl. No. 15/636,507, dated Sep. 7, 2018.
U.S. Office Action for U.S. Appl. No. 15/636,507, dated Feb. 23, 2018.

* cited by examiner

SPRING SEAT FOR AN INTERNAL VALVE

FIELD OF THE INVENTION

The present disclosure generally relates to an internal valve, and more specifically to a spring seat disposed within an internal valve.

BACKGROUND

Internal valves are used for a variety of commercial and industrial applications to control fluid flow between a fluid storage container and another container, hose, pipeline, etc. In particular, internal valves may protect against discharge of hazardous materials, compressed liquids, and gases such as, for example, propane, butane, and $NH_3$ (anhydrous ammonia), when transferring such material between a first location and a second location. Internal valves employ flow control mechanisms that close in response to a sudden excess flow condition due to, for example, a broken, severed, or otherwise compromised flow path. Such flow control mechanisms are commonly referred to as poppet valves or excess flow valves, which are often used in applications requiring an automatic, safe cutoff of fluid flow in response to potential leaks or spills of potentially dangerous fluids.

The poppet valve typically operates based on a pressure differential across the internal valve. For example, the poppet valve opens when the inlet pressure is approximately equal to the outlet pressure. The internal valve will typically employ a bleed valve to equalize or balance the pressure across the flow control member before opening the main valve. In one example, an internal valve may be used on an inlet or an outlet of a large storage tank and keeps the tank from rupturing from excessive internal tank pressure. The bleed valve allows the tank to vent or bleed the pressurized gas through a bleed flow path and eventually through the poppet valve until the tank pressure drops to an acceptable level before fully opening the valve.

SUMMARY

In accordance with a first exemplary aspect, an internal valve for connection to a fluid container may include a valve body having an inlet, an outlet, and defining a main flow path between the inlet and the outlet. A poppet valve may be coupled to the valve body and shiftable between an open position where the inlet of the valve body is open, and a closed position where the inlet of the valve body is closed. A bleed valve may include a bleed valve body having a bore, a bleed inlet, a bleed outlet, and defining a bleed flow path between the bleed inlet and the bleed outlet. The bleed valve may be arranged to open and close the bleed inlet. A valve stem may be slidably disposed in the valve body and operatively coupled to the bleed valve. An actuator may be operatively coupled to the valve stem and operable to shift the valve stem from a first position in which the poppet valve and the bleed valve are both closed, to a second position in which the bleed valve is open, and a third position in which the bleed valve is closed and the poppet valve is open. When the valve stem is in the third position, the poppet valve may be arranged to shift toward the closed position and the bleed valve may be arranged to open in response to a pressure change. A spring seat may be coupled to the valve stem via a retaining feature such that the spring seat is movably disposed in the valve body. A spring may be disposed in the main flow path and operatively coupled to the valve stem via the spring seat and is configured to bias the valve stem toward the first position.

In accordance with a second exemplary aspect, an internal valve for equalizing a pressure differential may include a valve body having an inlet, an outlet, and defining a main flow path between the inlet and the outlet. A poppet valve may be arranged to open and close the inlet of the valve body. A bleed valve may include a bleed valve body having a bore, a bleed inlet, a bleed outlet, and defining a bleed flow path between the bleed inlet and the bleed outlet. The bleed valve may be arranged to open and close the bleed inlet. A valve stem may be slidably disposed in the valve body and operatively coupled to the bleed valve. The valve stem may be shiftable from a first position in which the poppet valve and the bleed valve are both closed, to a second position in which the bleed valve is open and the poppet valve is closed, and a third position in which the poppet valve is open and the bleed valve is closed. The internal valve also includes a spring seat coupled to the valve stem via a retaining feature such that the spring seat is movably disposed in the valve body. The spring seat includes an annular body defined by an outer wall and an inner wall spaced radially inward of the outer wall, the outer wall arranged to movably engage a portion of the valve body when the valve stem shifts between the first, second, and third positions, and the inner wall defining a central bore sized to receive the valve stem. The internal valve further includes a spring disposed in the main flow path and operatively coupled to the valve stem via the spring seat, the spring configured to bias the valve stem toward the first position.

In accordance with a third exemplary aspect, an internal valve for equalizing a pressure differential may include a valve body having an inlet, an outlet, and defining a main flow path between the inlet and the outlet. A poppet valve may be arranged to open and close the inlet of the valve body. A bleed valve may include a bleed valve body having a bore, a bleed inlet, a bleed outlet, and defining a bleed flow path between the bleed inlet and the bleed outlet. The bleed valve may be arranged to open and close the bleed inlet. A valve stem may be slidably disposed in the valve body and operatively coupled to the bleed valve. The valve stem may be shiftable from a first position in which the poppet valve and the bleed valve are both closed, to a second position in which the bleed valve is open and the poppet valve is closed, and a third position in which the poppet valve is open and the bleed valve is closed. A spring seat may be coupled to the valve stem via a retaining feature such that the spring seat is movably disposed in the valve body. The spring seat may include an annular body defined by an outer wall and an inner wall spaced radially inward of the outer wall, the outer wall arranged to movably engage a portion of the valve body when the valve stem shifts between the first, second, and third positions, and the inner wall defining a central bore sized to receive the valve stem. The spring seat may also include a recess formed in the annular body. The retaining feature may be partially disposed in the recess. A spring may be disposed in the main flow path and operatively coupled to the valve stem via the spring seat. The spring may be configured to bias the valve stem toward the first position.

In further accordance with any one or more of the foregoing first and second aspects, the internal valve may further include any one or more of the following preferred forms.

In a preferred form, the retaining feature may include a ring coupled to the valve stem.

In a preferred form, the retaining feature may include a ring coupled to the valve stem, and the ring may be seated in a recess formed in the spring seat, thereby retaining the spring seat between the spring and the ring.

In a preferred form, the retaining feature may include a pin extending through a portion of the valve stem.

In a preferred form, the retaining feature may include a pin extending through a portion of the valve stem, and the pin may be seated in a recess formed in the spring seat, thereby retaining the spring seat between the spring and the pin.

In a preferred form, the retaining feature may include a pin extending through a portion of the valve stem, the valve stem may be shiftable along a longitudinal axis, and the pin may be oriented along an axis that is substantially perpendicular to the longitudinal axis.

In a preferred form, the retaining feature may include an annular shoulder of the valve stem.

In a preferred form, the spring seat may include a groove sized to receive the spring, and the groove may be configured to limit horizontal movement of the spring relative to the valve stem.

In a preferred form, a guide sleeve may be seated between a portion of the spring seat and the valve body.

In a preferred form, the spring seat may have an inlet end and an outlet end, the inlet end may face the inlet of the valve body, the outlet end may face the outlet of the valve body, the inlet end of the spring seat may be disposed immediately adjacent the spring, and the retaining feature may be disposed immediately adjacent the outlet end of the spring seat.

In a preferred form, the spring seat may include an annular body defined by an outer wall and an inner wall spaced radially inward of the outer wall, the outer wall may be arranged to movably engage a portion of the valve body when the valve stem shifts between the first, second, and third positions, and the inner wall may define a central bore sized to receive the valve stem.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several Figures, in which:

DETAILED DESCRIPTION

Although the following text sets forth a detailed description of one or more exemplary embodiments of the invention, it should be understood that the legal scope of the invention is defined by the words of the claims set forth at the end of this patent. The following detailed description is to be construed as exemplary only and does not describe every possible embodiment of the invention, as describing every possible embodiment would be impractical, if not impossible. Numerous alternative embodiments could be implemented, using either current technology or technology developed after the filing date of this patent, and such alternative embodiments would still fall within the scope of the claims defining the invention.

Figure 1:
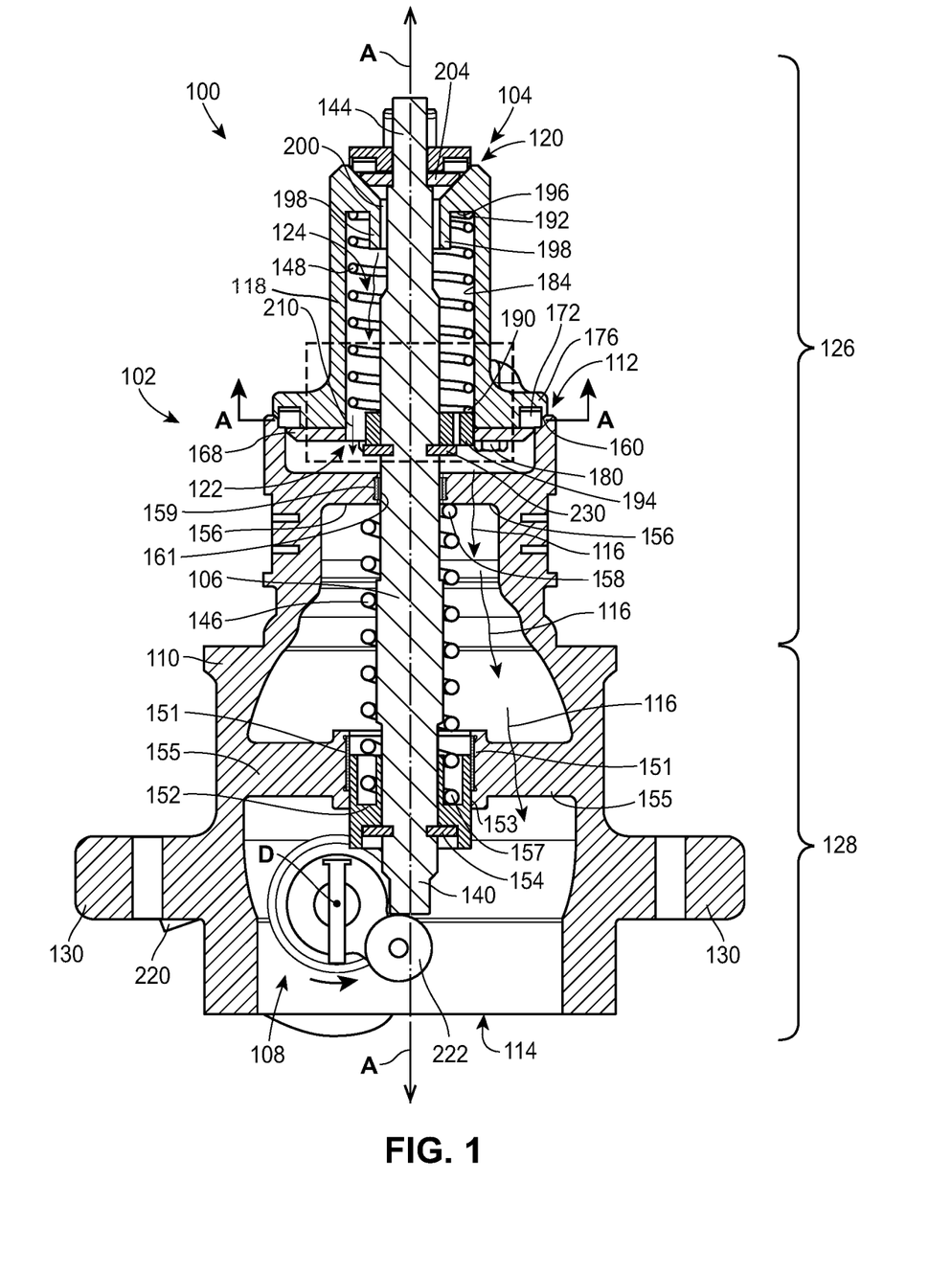
FIG. 1 is a cross-sectional view of an internal valve constructed according to the teachings of the present disclosure and in a closed configuration, the internal valve including a valve stem, one example of a first spring seat, and one example of a retaining feature for operatively coupling the first spring seat to the valve stem.

FIG. 1 illustrates an example internal valve 100, also referred herein as an internal valve assembly, including a poppet valve 102, a bleed valve 104, a valve stem 106, an actuator 108, and a valve body 110. The valve body 110 includes an inlet 112, an outlet 114, and defines a main fluid flow path 116 between the inlet 112 and the outlet 114. The poppet valve 102 is arranged to open and close the inlet 112 of the valve body 110 based on a pressure and/or a fluid flow rate of a system in which the internal valve 100 is coupled or installed. In high pressure environments, it may be necessary to equalize the pressure between an upstream fluid source and a downstream fluid source or fluid container before the fluid is pumped through the internal valve 100. Such equalization may be achieved by the bleed valve 104. The bleed valve 104 includes a bleed valve body 118 having a bleed inlet 120, a bleed outlet 122, and defining a bleed flow path 124 between the bleed inlet 120 and the bleed outlet 122. The valve stem 106 is slidably disposed in the valve body 110 as well as the bleed valve body 118 and is operatively coupled to both the bleed valve 104 and to the actuator 108.

Figure 12:
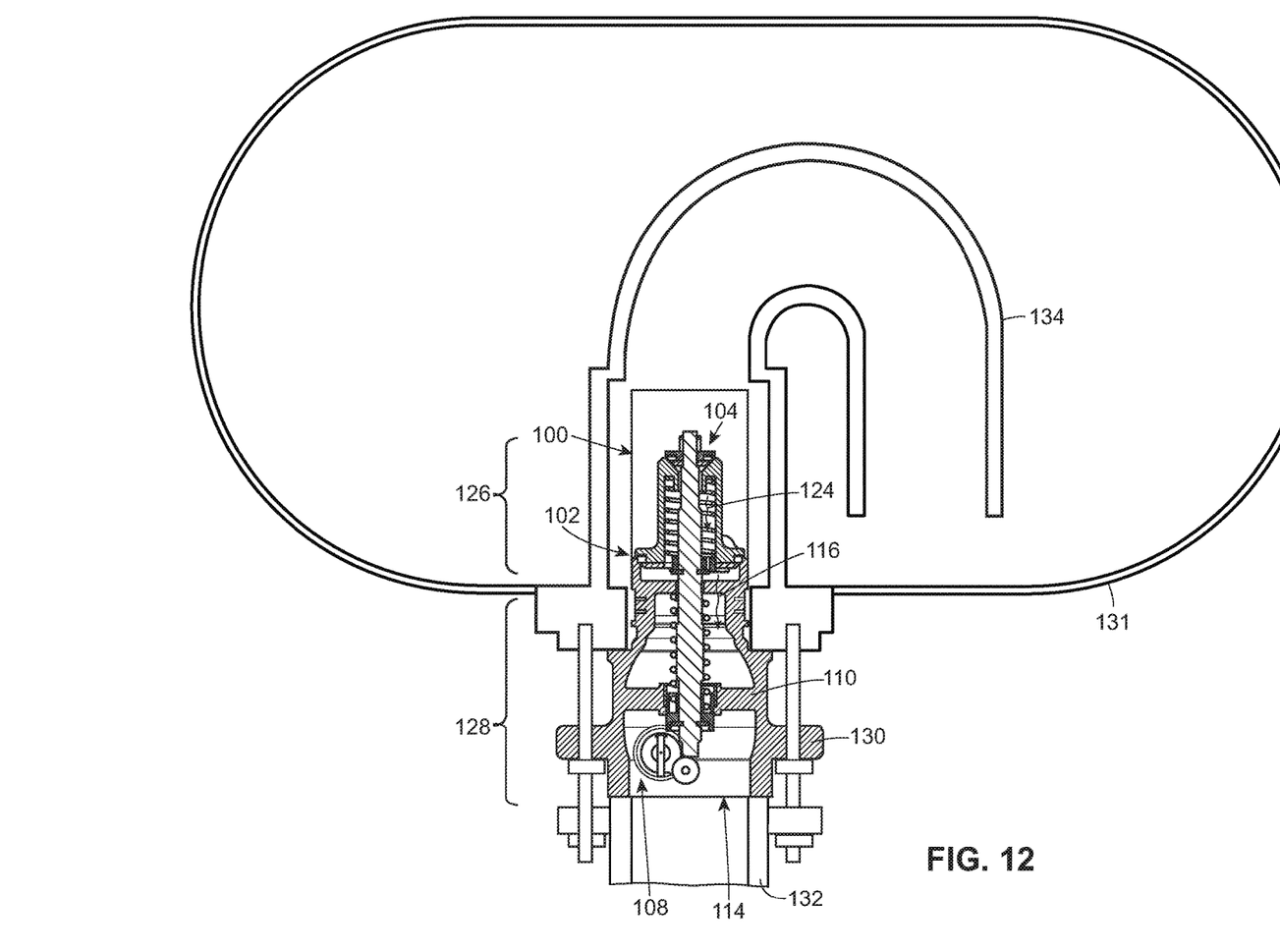
FIG. 12 is a schematic of the internal valve assembly of FIG. 1 attached to an upstream fluid source according to the teachings of the present disclosure.

The internal valve 100 may be installed so that a first or upper portion 126 of the valve 100 is arranged to be in fluid communication with a first or upstream fluid source, e.g., a pipeline, a bobtail truck, or a tank, at which relatively high pressure process fluid may be introduced. A second or lower portion 128 of the valve 100 is arranged to be in fluid communication with a second or downstream fluid source, e.g., a pump, a pipeline, or a hose, a bobtail truck, to which the internal valve 100 provides the process fluid. The valve body 110 includes a flanged portion 130 for coupling (e.g., mounting) the internal valve 100 to a piping system, a storage tank, a bobtail truck system, or any other suitable fluid distribution system. For example, FIG. 12 illustrates the internal valve 100 in fluid communication with an upstream fluid source in the form of a tank 131 containing a fluid, such as a pressurized gas or liquid, to be delivered to a destination via the internal valve 100. The first portion 126 of the internal valve 100, which includes the entire bleed valve 104, may be immersed in or surrounded by relatively high pressure fluid. The second portion 128 may be disposed outside of the tank 131 to receive a conduit 132, such as a pipe, a hose, or any other suitable conduit, at the outlet 114 of the valve body 110. The process fluid may flow from the tank 131 via a conduit 134, such as a hose, and through the internal valve 100. When the bleed valve 104 is open, the process fluid may flow through the bleed flow path 124 and the main flow path 116, through the outlet 114 of the valve body 110, and to a destination such as, for example, another storage tank and/or additional process control system. When the poppet valve 102 is open, the process fluid may flow through the inlet 112, through the main fluid flow path 116, and out the outlet 114 of the valve body 110.

The actuator 108 may be removably coupled to the body 110 so that the actuator 108 can be removed without having to remove the valve 100 from the system while the internal valve 100 is in-line with the system. The actuator 108 includes a lever 220 coupled to a rotatable cam 222 which rotates the cam 222 about an axis D to engage the bottom end 140 of the valve stem 106 and shift the valve stem 106 in the axial direction. While the actuator 108 in the illustrated example includes the rotatable lever 220 and the cam 222, the internal valve assembly 100 of the present disclosure is not limited to the illustrated actuator arrangement. For example, in other embodiments the actuator 108 may be an automated or manually-operated rotatable or linear drive mechanism arranged to shift the valve stem 106 between the first, second, and third positions. Moreover, another embodiment of the valve 100 may include an additional operating position in which the actuator 108 shifts the valve stem 106 to a position between any two of the first, second, and third positions. In one such additional operating position, both the bleed valve 104 and the poppet valve 102 may be open.

The function and operation of the internal valve assembly 100 will be described in four sequential operating configurations: a closed configuration shown in FIG. 1, a jet bleed configuration shown in FIG. 2, an open configuration shown in FIG. 3, and a limited bleed configuration shown in FIG. 4. The operating configurations of the valve 100 may be selected by the actuator 108, which is operatively coupled to a bottom end 140 of the valve stem 106. The actuator 108 is operable to shift the valve stem 106 between first, second, and third positions. The valve stem 106 may be shiftable along a longitudinal axis A of the internal valve 100 or along an axis parallel to the longitudinal axis A. When the valve stem 106 is in the first position, both the poppet valve 102 and the bleed valve 104 are closed and the actuator 108 does not engage with or connect with the bottom end 140 of the valve stem 106. A first spring 146 is arranged to bias the internal valve 100 in the closed position. Opposite the bottom end 140, a top end 144 of the valve stem 106 is operatively coupled to the bleed valve 104, enabling the actuator 108 to control the bleed valve 104 by moving the valve stem 106 along the longitudinal axis A. A second spring 148 is arranged to bias the poppet valve 102 between the open position and the closed position to respond to fluid pressure changes. As will be explained in further detail below, the second spring 148 is arranged to shift the poppet valve 102 toward the closed position and is arranged to open the bleed valve 104 while the valve stem 106 is in the third position.

The valve body 110 of the internal valve 100 encloses the first spring 146 and a portion of the valve stem 106. The first spring 146 is retained between a first spring seat 152 and a first set of inwardly extending portions 156 of the valve body 110, with a first end 157 of the spring 146 seated against a surface of the first spring seat 152 and a second end 158 of the spring 146, opposite the first end 157, seated against the inwardly extending portions 156. The first spring 146 may be a closing spring and is operatively coupled to the valve stem 106 via the first spring seat 152, and is arranged to bias the valve stem 106 in a downward direction to close the poppet valve 102 and the bleed valve 104. The first spring 146 provides a downward spring force to the valve stem 106, urging the valve stem 106 to occupy the first position shown in FIG. 1. The inwardly extending portions 156 define an annular bore 161 in which a bushing 159 is disposed. The bushing 159 guides the stem 106 through the body 110 and facilitates smooth axial movement of the valve stem 106. Further, the valve body 110 defines a seating surface or valve seat 160 at the inlet 112, which leads to an orifice 164 connecting the upstream fluid source to the main fluid flow path 116. When the poppet valve 102 is in the open position, the main fluid flow path 116 is established between the inlet 112 and the outlet 114.

The poppet valve 102 is coupled to the valve body 110 and is operable to open and close the inlet 112 of the valve body 110. The poppet valve 102 is also operatively coupled to the bleed valve body 118. When the poppet valve 102 shifts between an open position to open the inlet 112 and a closed position to close the inlet 112, the bleed valve body 118 moves toward and away from the inlet 112 of the valve body 110. In other words, in the illustrated example of the internal valve 100, the bleed valve body 118 is inherently part of the operation of the poppet valve 102. In the illustrated example, the bleed valve body 118 is depicted as a disc-type valve assembly that includes or carries a valve disc 168 of the poppet valve 102 that engages the valve seat 160 to restrict the flow of fluid through the valve body 110. The poppet valve 102 is shiftable between an open position in FIG. 3 where the valve disc 168 and the bleed valve body 118 are spaced away from the valve seat 160, and a closed position in FIGS. 1, 2, and 4 where the valve disc 168 is seated against the valve seat 160. A disc retainer 172 couples the disc 168 to a disc holder portion 176 of the bleed valve body 118 by one or more fasteners 180.

The bleed valve 104 is coupled to the valve stem 106, and includes the bleed valve body 118 having a bore 184 that houses the second spring 148. The second spring 148 may be an excess flow spring and is arranged to bias the bleed valve body 118 toward the seating surface 160 to restrict the fluid flow through the orifice 164 when the flow rate through the valve 100 exceeds a specified or predetermined flow rate, e.g., an excess flow limit or rate of the valve 100. The second spring 148 includes a bottom end 190 and a top end 192, and is retained between a second spring seat 194 and a shoulder 196, which is defined by the bore 184 and a cylindrical portion 198. The top end 192 of the second spring 148 bears against the shoulder 196 and the bottom end 190 of the second spring 148 bears against the second spring seat 194. The second spring seat 194 is operatively coupled to the valve stem 106 such that the second spring seat 194 moves with the valve stem 106 as the stem 106 shifts in the axial direction along the longitudinal axis A. The spring seat 194 defines at least a portion of one or more flow apertures 210 disposed in the bleed flow path, which permits fluid communication between the bleed inlet 120 and the bleed outlet 122. A bleed port 200 may be integrally formed with the bleed valve body 118, and in particular, may be defined as the opening formed by the cylindrical portion 198 of the bleed valve body 118. The bleed port 200 is disposed within the bleed flow path 124 and fluidly connects the bleed inlet 120 and the bore 184, and the bore 184 fluidly connects the bleed inlet 120 and the bleed outlet 122. A bleed disc 204 is shiftable between an open bleed position, shown in FIGS. 2 and 4, where the bleed disc 204 is spaced away from a bleed seat 208 and the bleed port 200, and a closed bleed position, shown in FIGS. 1 and 3, where the bleed disc 204 is seated against the bleed seat 208, sealing the bleed port 200 from the upstream fluid source. Taken together, the poppet valve 102 and the bleed valve 104 form the internal valve 100.

Turning now specifically to FIG. 1, the internal valve 100 is in the first or closed operating configuration. In the closed configuration, the poppet valve 102 is in the closed position and the bleed valve 104 is in the closed bleed position such that the outlet 114 is sealed off from the upstream fluid source. The valve disc 168 carried by the bleed valve body 118 is biased toward the closed position by the second spring 148 and/or by the pressure of the upstream fluid source at the inlet 112. The bleed disc 204 of the bleed valve 104 is biased toward the closed bleed position by the first spring 146 via the valve stem 106. When both the poppet valve 102 and the bleed valve 104 are closed, the valve disc 168 engages the valve seat 160 to prevent the flow of fluid through the orifice 164, and the bleed disc 204 engages the bleed seat 208 to prevent the flow of fluid through the bleed port 200.

In FIG. 1, the operating lever 220 of the actuator 108 is in a first position whereby the rotatable cam 222 does not engage the bottom end 140 of the valve stem 106. When, however, the actuator 108 is operated to shift the valve stem 106 in the axial direction along the longitudinal axis A from the position shown in FIG. 1 to the position shown in FIG. 2, the lever 220 is moved to a second position, which causes the cam 222 to rotate about the axis D until the cam 222 engages the bottom end 140 of the valve stem 106. In this example, the second position of the lever 220 corresponds to a midpoint of its travel path positioned 35 degrees relative to the first position. Movement of the valve stem 106 to the position shown in FIG. 2 compresses the first spring 146 between the first spring seat 152 and the valve body 110, causing the bleed disc 204 to move away from the bleed seat 208, thereby moving the internal valve 100 from the closed operating configuration to the jet bleed configuration.

Figure 2:
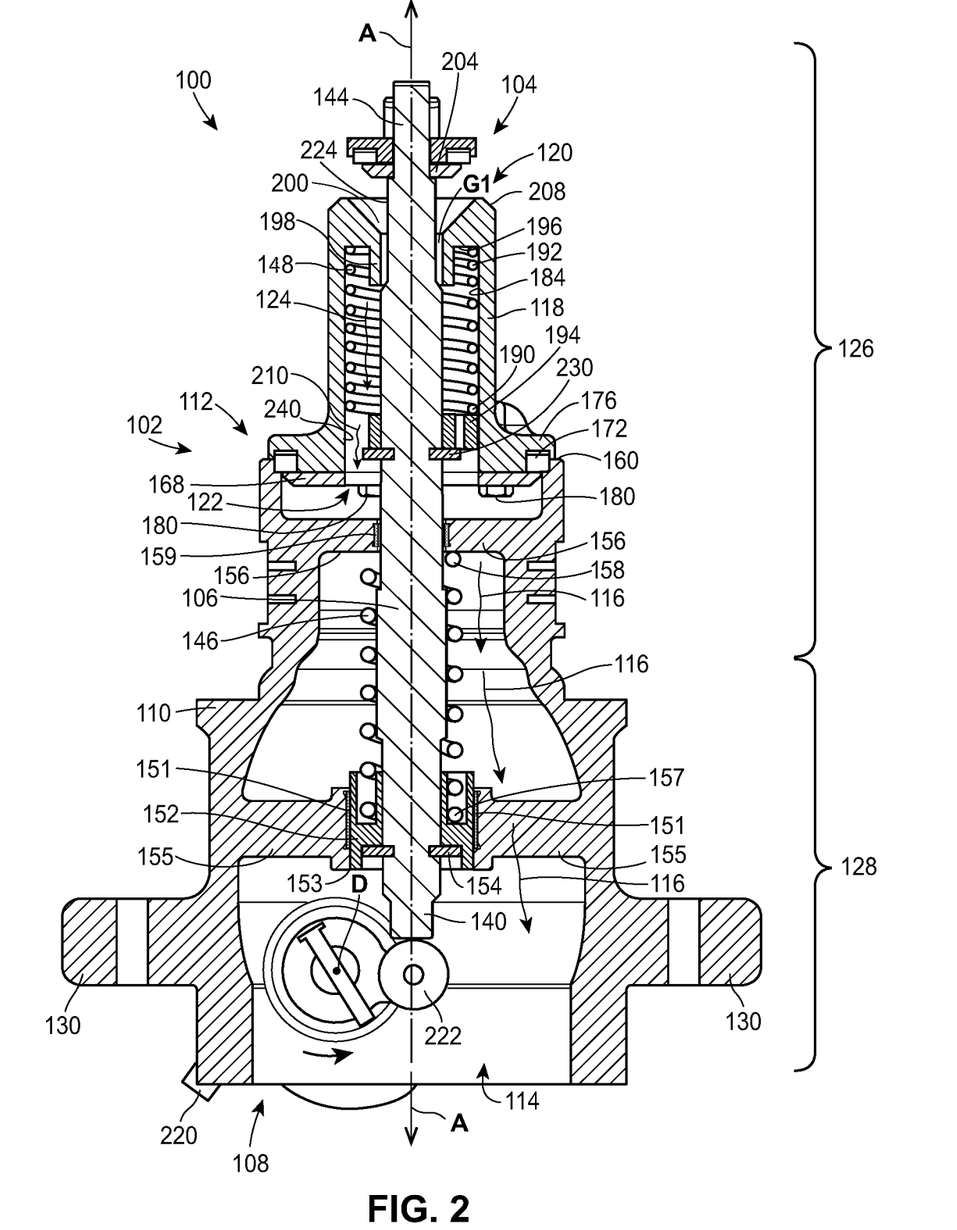
FIG. 2 is a cross-sectional view of the internal valve assembly of FIG. 1 in a jet bleed configuration.

In the jet bleed configuration of FIG. 2, the valve stem 106 is in the second position and the poppet valve 102 remains closed, but bleed valve 104 is in the open position, thereby permitting fluid from the upstream fluid source to enter the bleed inlet 120 and equalize the pressure differential across the valve 100. A portion of the valve stem 106 that is disposed in the bleed port 200 includes a reduced diameter or a recessed portion 224 to permit fluid flow between the cylindrical portion 198 of the bleed valve body 118 and the valve stem 106. In the jet bleed configuration, the recessed portion 224 forms a gap G1 between the valve stem 106 and the bleed port 200. So configured, the bleed valve 104 may allow for greater fluid flow through the bleed port 200 to the bleed flow path 124, which may result in quicker pressure equalization across the valve 100. The flow aperture(s) 210 formed in the second spring seat 194 fluidly connects the bleed flow path 124 to the inlet 112 of the poppet valve 102, permitting fluid to continuously flow through the valve 100 until the upstream pressure and downstream pressure are nearly equal. The poppet valve 102 remains in the closed position until a pressure of the upstream fluid source is less than the spring force of the second spring 148, causing the second spring 148 to expand and push the bleed valve body 118 upward in the axial direction toward the open position. The gap G1 provided by the placement of the recessed portion 224 of the stem 106 relative to the bleed port 200 together with the flow aperture(s) 210 of the second spring seat 194 may expedite equalization of the internal valve 100.

The first spring 146 and the second spring 148 are compressed while fluid flows from the upstream fluid source through the bleed valve 104 and into the poppet valve 102. The first spring seat 152 is movably (e.g., slidably) disposed in a guide sleeve 151 (e.g., a bushing) seated in an annular bore 153 defined by and between a second set of opposed inwardly extending portions 155 of the valve body 110, and is coupled to the valve stem 106 via a retaining feature 154 such that the first spring seat 152 is movably (e.g., slidably) disposed in the body 110 relative to the guide sleeve 151 and the bore 153 of the valve body 110. The first spring seat 152 thus applies a force (in this case, an upward force) against the first spring 146 when the valve stem 106 shifts upward, causing the first spring 146 to compress against the inwardly extending portions 156 of the valve body 110. The second spring seat 194 is operatively coupled to the valve stem 106 via a ring, e.g., a clip 230, and moves further into the bore 184 of the bleed valve 104 as the valve stem 106 shifts upward in the axial direction. The second spring 148 compresses between the shoulder 196 of the bleed valve body 118 and the second spring seat 194. Depicted in FIG. 2, the force exerted by the second spring 148 onto the shoulder 196 and spring seat 194 is not yet sufficient to overcome the force of pressure of the upstream fluid source on the poppet valve 102, and therefore the poppet valve 102 remains in the closed position. In another example, the second spring seat 194 may be coupled to the valve stem 106 by pin extending through the valve stem 106 or by a notch or a groove formed in the surface of the valve stem 106. Further details regarding the second spring seat 194 are described in co-pending U.S. Non-Provisional application Ser. No. 15/635,708, entitled "Spring Seat for an Internal Valve".

When the actuator 108 is operated to shift the valve stem 106 in the axial direction from the second position (FIG. 2) to a third position (FIG. 3), the lever 220 is moved to a third position by completing its travel path, thereby further rotating the cam 222 about the axis D and driving the valve stem 106 further upward. Movement of the valve stem 106 to the position shown in FIG. 3 further compresses the first spring 146 and the second spring 148, which forces the poppet valve 102 to open as the pressure of the upstream fluid source approximately equals the pressure of the downstream fluid source, thereby moving the internal valve 100 from the jet bleed configuration to the open operating configuration.

Figure 3:
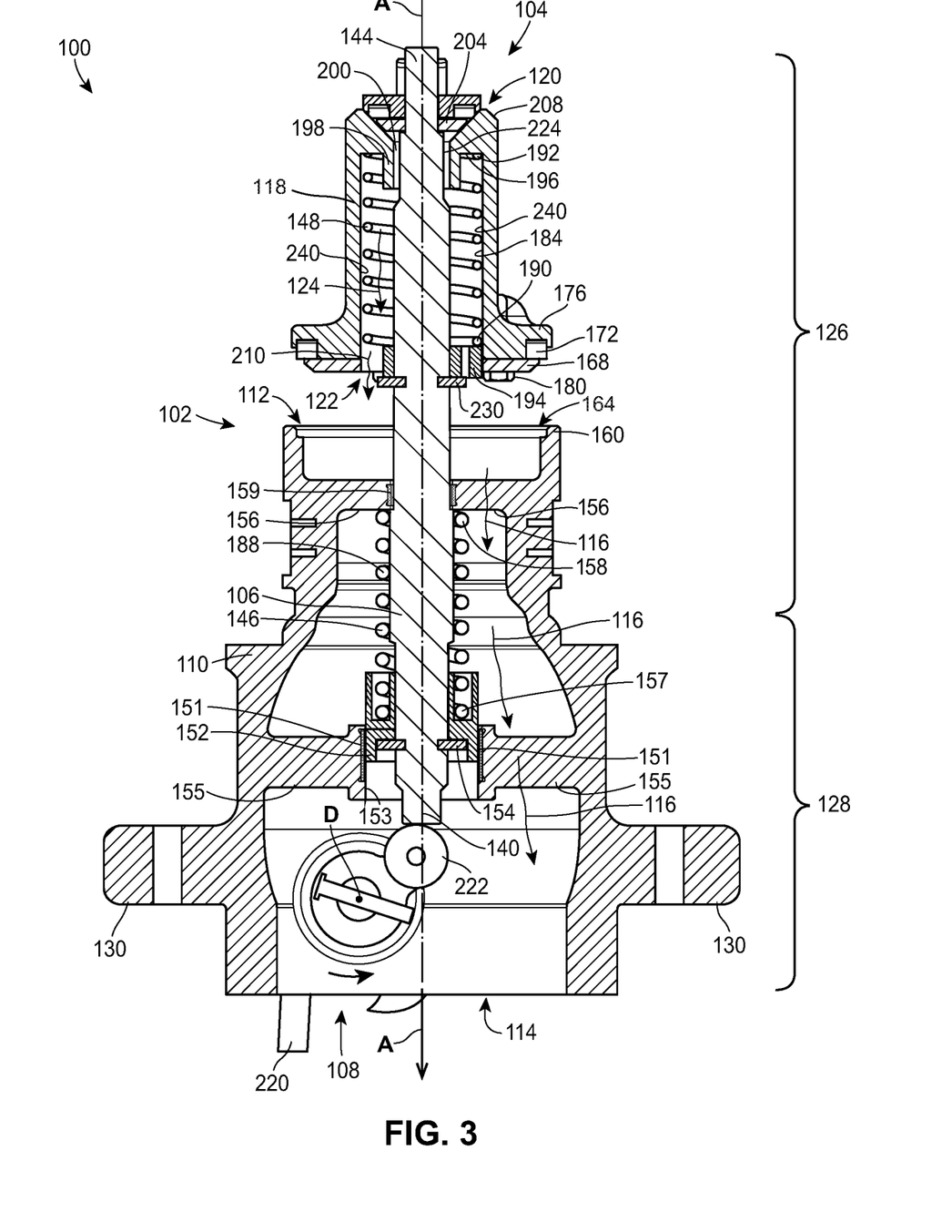
FIG. 3 is a cross-sectional view of the internal valve assembly of FIG. 1 in an open configuration.
Figure 4:
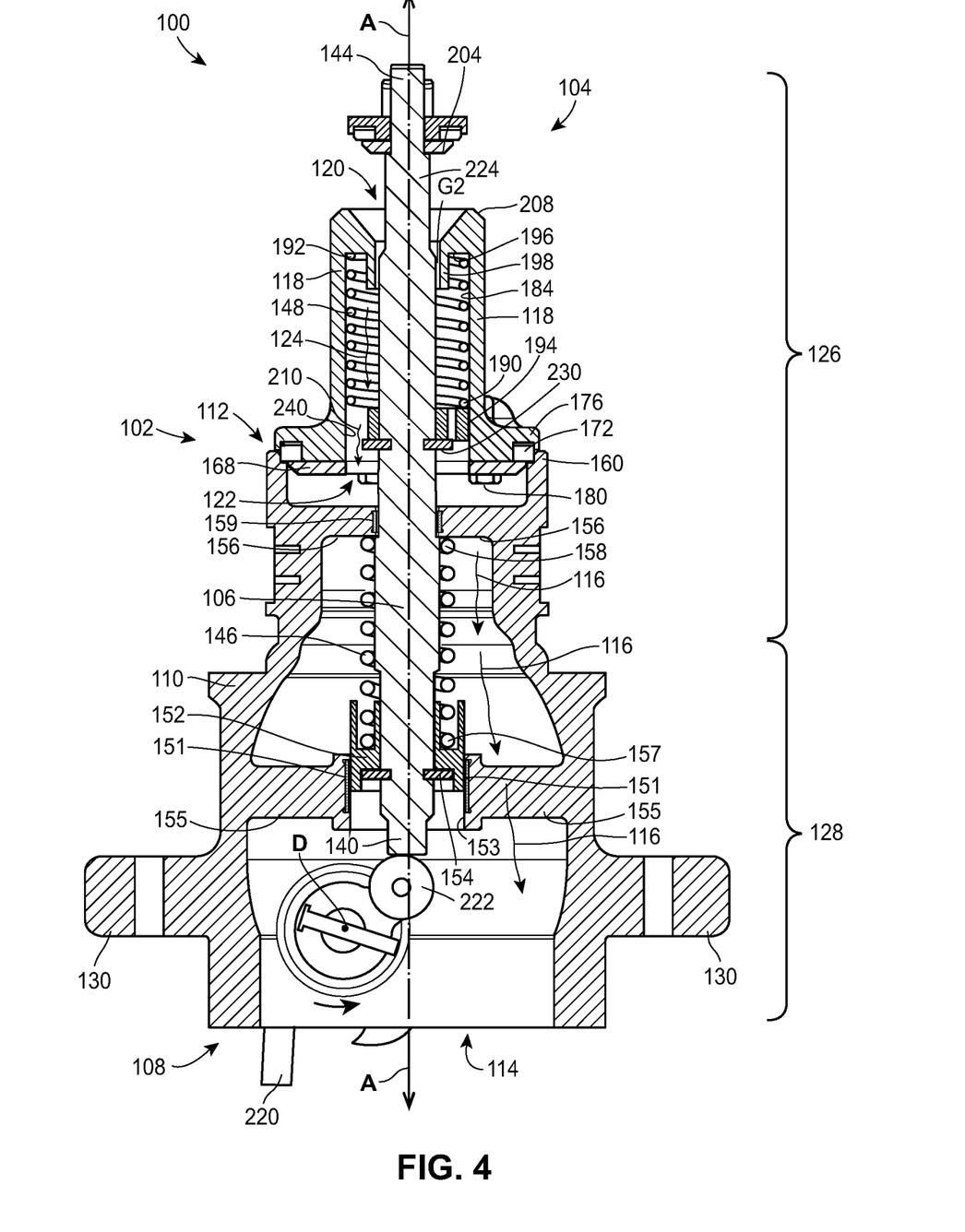
FIG. 4 is a cross-sectional view of the internal valve assembly of FIG. 1 in a limited bleed configuration.

FIG. 3 illustrates the internal valve 100 in the open operating configuration, where the poppet valve 102 is in the open position, permitting fluid to flow from the upstream pressure source into the inlet 112 of the valve 100, into the orifice 164, through the main flow path 116, and out of the valve 100 via the outlet 114. The bleed seat 208 of the bleed valve body 110 meets the bleed disc 204 when the second spring 148 expands in the axial direction and shifts the bleed valve body 118 upward and away from the inlet 112. In response to the pressure differential across the valve 100, the expansion of the second spring 148 causes the second spring seat 194 to slide downward within to the bore 184.

When, however, the upstream pressure overcomes the spring force of the second spring 148, the poppet valve 102 is moved back to the closed position. Alternatively, the flow rate through the valve 100 may exceed a specific or predetermined flow rate, causing the bleed valve body 118 to move toward the valve seat 160 to close the poppet valve 102. In any event, the closing of the poppet valve 102 moves the valve 100 from the open operating configuration illustrated in FIG. 3 to the limited bleed configuration illustrated in FIG. 4. In the limited bleed configuration, the bleed valve 104 is in the open bleed position. The recessed portion 224 of the valve stem 106 is thus placed above the bleed port 200. In this position, the recessed portion 224 is not disposed in the bleed port 200 sufficiently to form gap G1, and instead a gap G2 is defined between the valve stem 106 and the valve port 200. Gap G2 is smaller than gap G1 formed by the recessed portion 224 of the valve stem 106 and the valve port 200 in the jet bleed configuration. The formation of gap G2 permits a limited amount of fluid to bleed through the bleed port 200 relative to the amount of fluid that is permitted to bleed through the bleed port 200 in the jet bleed configuration.

According to the teachings of the present disclosure, the bleed valve 104 and the poppet valve 102 provide an excess flow functionality that maintains system safety and permits the bleed valve 104 and the poppet valve 102 to open and close, as illustrated in FIGS. 1-4. The excess flow function protects the system by automatically restricting fluid flow into the inlet 112 when a flow rate becomes too high within the valve 100. In particular, the poppet valve 102 operates based on a pressure differential between the inlet pressure and the outlet pressure, and the second spring 148 has an excess flow spring rate that causes the bleed valve body 118 and the valve disc 168 to move toward the seating surface 160 when the flow rate through the valve 100 exceeds a specific or predetermined flow rate. When the inlet pressure is substantially greater than the outlet pressure, the bleed valve body 118 carrying the valve disc 168 remains biased toward the seating surface 160 in the closed configuration depicted in FIG. 1. The bleed valve 104 is arranged to equalize or balance the pressure between the inlet 112 and outlet 114, and the bleed valve 104 may place the valve 100 in the jet bleed configuration shown in FIG. 2 to allow a certain amount of fluid to bleed into the internal valve 100. When the inlet pressure is approximately equal to the outlet pressure, the second spring 148 opens the poppet valve 102 to allow fluid to flow through the internal valve 100 as shown in FIG. 3. Once the poppet valve 102 opens, a fluid flow greater than the spring rate of the second spring 148 may force the poppet valve 102 to close against the second spring 148 shown in FIG. 4. In the limited bleed configuration, the bleed valve 104 is opened to permit a smaller amount of fluid to bleed into valve 100.

Additional details regarding the first spring seat 152 and the retaining feature 154 will now be described in connection with FIGS. 5-7. While the first spring seat 152 and the retaining feature 154 are illustrated in connection with the internal valve 100 of FIGS. 1-4, the present disclosure is not intended to limit the illustrated first spring seat 152 and the retaining feature 154 to the internal valve 100. In other words, the first spring seat 152 and/or the retaining feature 154 can be utilized in connection with a different internal valve, a fluid regulator, a fluid control valve, or other piece of process control equipment.

Figure 5:
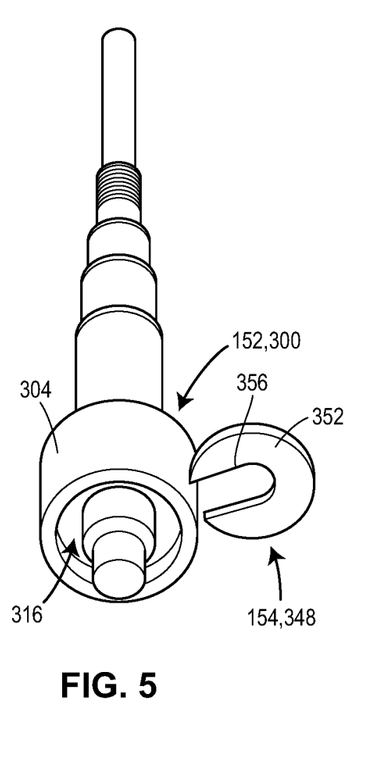
FIG. 5 is a perspective view of the valve stem, the first spring seat, and the retaining feature for operatively coupling the valve stem to the first spring seat.
Figure 6:
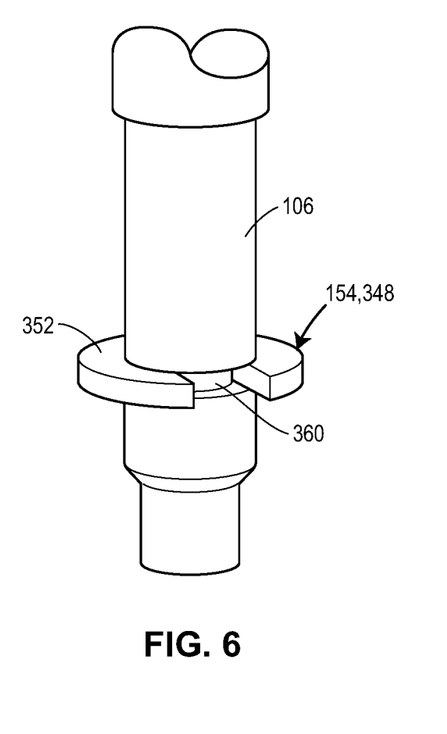
FIG. 6 is a perspective view of the retaining feature coupled to the valve stem.
Figure 7:
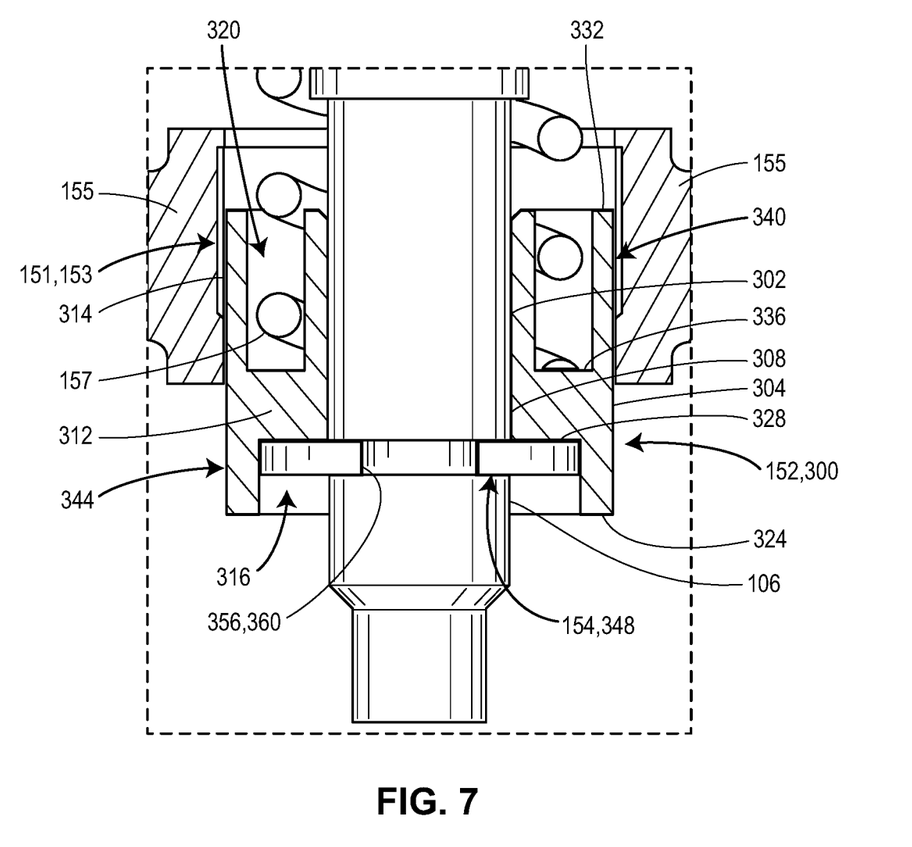
FIG. 7 is a close up, cross-sectional view of a portion of the internal valve of FIGS. 1-4, showing the first spring seat and the retaining feature operatively coupling the first spring seat to the valve stem.

As illustrated in FIGS. 5 and 7, the first spring seat 152 has an annular body 300 and a guide bore 302 formed in and extending through the cylindrical body 300 along the longitudinal axis A. The cylindrical body 300 is defined by an outer or perimeter cylindrical wall 304, an inner cylindrical wall 308 spaced radially inward of the outer wall 304, and a base portion 312 that connects the outer wall 304 and the inner wall 308. When the first spring seat 152 is arranged in the internal valve 100, at least a portion of the outer wall 304 movably engages an inner surface 314 of the guide sleeve 151 as the valve stem 106 shifts between the first, second, and third positions along the longitudinal axis A. The guide sleeve 151, which in this example takes the form of an annular bushing made of PTFE or any other suitable material, helps to smoothly guide the first spring seat 152 as the first spring seat 152 moves (e.g., slides) within the valve body 110 and along the longitudinal axis A as the valve stem 106 shifts along the longitudinal axis A. The inner wall 308, meanwhile, helps to define the guide bore 302, which in this example is an annular bore that receives a portion of the valve stem 106 therethrough such that the valve stem 106 frictionally engages the inner wall 308 without sliding or slipping relative to the first spring seat 152 during operation of the internal valve 100.

With reference still to FIGS. 5 and 7, the first spring seat 152 also includes an annular recess 316 and an annular groove 320. The recess 316 is formed or defined in an outlet end 324 of the body 300 that faces the outlet 116 of the valve body 110. More specifically, the recess 316 is formed or defined in the outlet end 324 by and between the outer wall 304 and a first, or bottom, surface 328 of the base portion 312. The recess 316 is thus sized and arranged to receive the retaining feature 154 that couples the first spring seat 152 to the valve stem 106. The groove 320 is formed or defined in an inlet end 332 of the body 300 that is opposite the outlet end 324 and faces the inlet 114 of the valve body 110. More specifically, the groove 320 is formed or defined in the inlet end 332 by and between the outer wall 304, the inner wall 308, and a second, or top, surface 336 of the base portion 312. The groove 320 is sized to receive the first end 157 of the spring 146, as illustrated. As a result of the configuration of the annular recess 316 and the annular groove 320, a first portion 340 of the outer wall 304, located above the base portion 312, has a thickness that is smaller than a thickness of a second portion 344 of the outer wall 304, located below the base portion 312. Additionally, the outer wall 304 has a height that is greater than a height of the inner wall 308.

As briefly discussed above, when the first spring seat 152 is utilized in the internal valve 100, the first spring seat 152 is arranged in the bore 153 (and partially within the guide sleeve 151) and is operatively coupled to the valve stem 106 via the retaining feature 154. As illustrated in FIGS. 5-7, the retaining feature 154 in this example takes the form of a split ring 348 having a body 352 and a U-shaped opening 356 formed in the body 352. The U-shaped opening 356 is sized to receive a reduced diameter portion 360 of the valve stem 106, such that the split ring 348 is disposed on, and partially if not substantially surrounds, the reduced diameter portion 360 of the valve stem 106. The body 352 also has an outer diameter that is larger than portions of the valve stem 106 adjacent the reduced diameter portion 360, such that a portion of the split ring 348 extends outward of and from the valve stem 106. The reduced diameter portion 360 is positioned under (or downstream of) the base portion 312 of the first spring seat 152, such that the split ring 348 is arranged within the recess 316 and, in turn, completely recessed within the first spring seat 152. While the split ring 348 is theoretically movably arranged within the recess 316, the split ring 348 engages the bottom surface 328 of the base portion 312, as illustrated in FIG. 7. Thus, the base portion 312 of the first spring seat 152 is disposed and retained between the first spring 146 and the split ring 348, with both the first spring 146 and the split ring 348 serving to keep the first spring seat 152 operatively coupled to, and in radial and axial alignment with, the valve stem 106.

As a result of this arrangement, when the valve stem 106 is shifted upward along the longitudinal axis A (to, e.g., the second or third position), the split ring 348 applies an upward force on the bottom surface 328 and, more generally, the first spring seat 152, driving the first spring seat 152 upward (and causing the first spring 146 to compress against the internal shoulder 156). Conversely, when the valve stem 106 is shifted downward along the longitudinal axis A (e.g., back to the first position), the spring 146, which is seated in the groove 320 against the top surface 336, drives the first spring seat 152 downward along the longitudinal axis A until the base portion 312 again engages the split ring 348.

In other examples, the first spring seat 152 can vary and yet still perform the intended functionality described herein. In one example, the first spring seat 152 may not include the annular recess 316, and the split ring 348 (or other retaining feature 154) can be seated flush against the bottom surface of the first spring seat 152. In another example, the first spring seat 152 may not include the annular groove 320, and the first spring 146 may be seated flush against the top surface of the first spring seat 152 (instead of being disposed in the annular groove 320). In yet another example, the outer wall 304 may have a consistent thickness, such that the first portion 340 and the second portion 344 of the outer wall 304 may have the same thickness (instead of the first portion 340 being less thick than the second portion 344).

FIGS. 7-10 illustrate another example of a first spring seat 452 (FIGS. 7 and 10) that can be utilized in the internal valve 100 (instead of the first spring seat 152) and another example of a retaining feature 154 (FIGS. 8-10) that can be used to operatively couple the first spring seat 452 to the valve stem 106 (and vice-versa). While these two additional examples are described in connection with one another, it will nonetheless be appreciated that these examples need not be utilized together. In other words, the first spring seat 452 can be operatively coupled to the valve stem 106 using the split ring 348 or another retaining feature 154, and the retaining feature 154 illustrated in FIGS. 8-10 can be used to operatively couple the first spring seat 152, or another first spring seat, to the valve stem 106 (and vice-versa).

Figure 8:
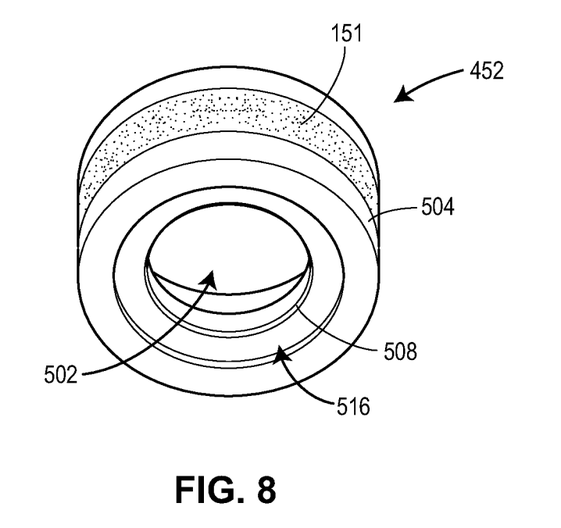
FIG. 8 is a perspective view of another example of a first spring seat constructed according to the teachings of the present disclosure.
Figure 9:
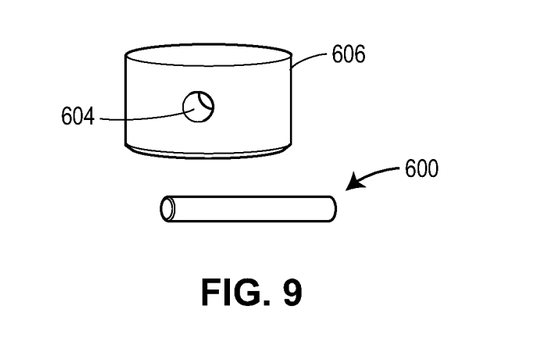
FIG. 9 is a close-up view of another example of a retaining feature, constructed according to the teachings of the present disclosure, for operatively coupling the first spring seat to the valve stem via an aperture formed in the valve stem.
Figure 10:
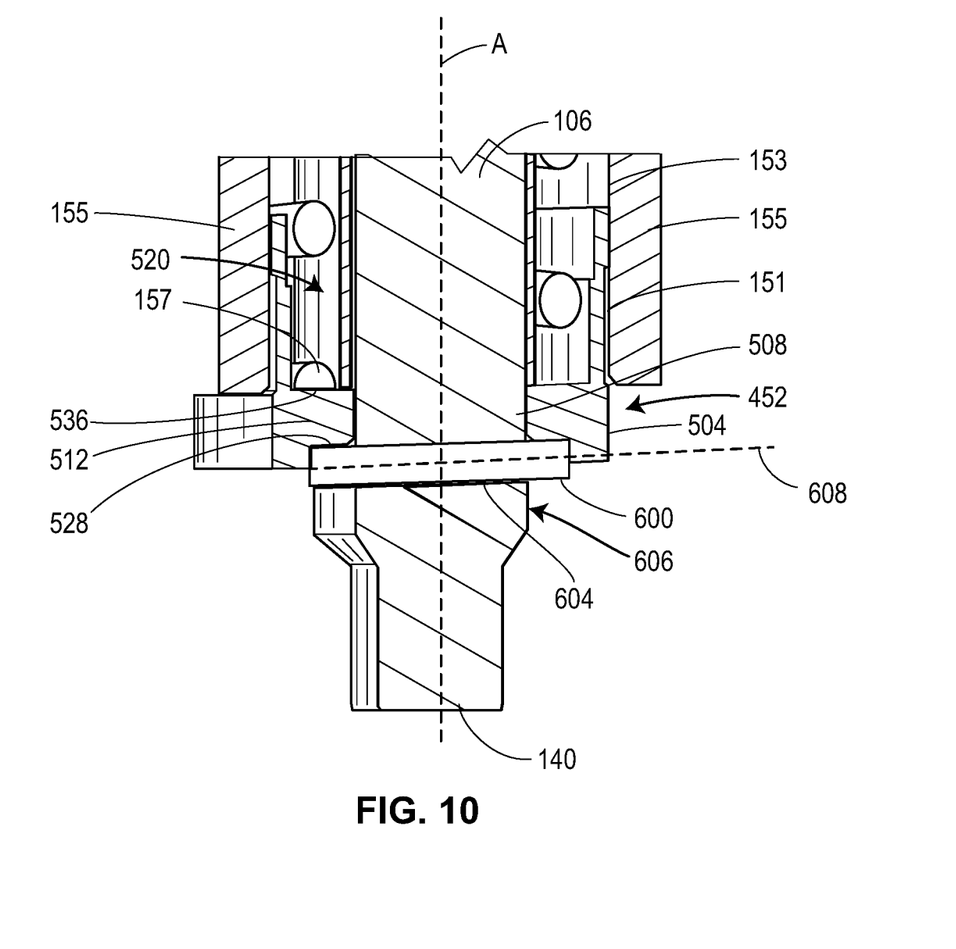
FIG. 10 is a close up, cross-sectional view of the first spring seat of FIG. 8 and the retaining feature of FIG. 9 utilized in the internal valve of FIGS. 1-4.

As illustrated in FIGS. 7 and 10, the first spring seat 452 is substantially similar to the first spring seat 152, with common components depicted using similar reference characters, but differs in that the annular recess 516 of the spring seat 452 is shallower than the annular recess 316 of the spring seat 152, and the guide sleeve 151 is integrally formed around a portion of the outer wall 504. As illustrated in FIGS. 8-10, the retaining feature 154 in this example takes the form of a cylindrical pin 600 that is disposed in a circular aperture 604 formed in and through a portion 606 of the valve stem 106 proximate the bottom end 140. When the cylindrical pin 600 is disposed in the aperture 604, the cylindrical pin 600 extends entirely through and radially outward of the valve stem 106, and the cylindrical pin 600 is oriented along an axis 608 that is substantially perpendicular (if not exactly perpendicular) to the longitudinal axis A. The portion 606 of the valve stem 106 that includes the aperture 604 is positioned under (or downstream of) the base portion 512 of the first spring seat 452, such that the pin 600 is partially arranged within the recess 516 and, in turn, partially recessed within the first spring seat 452 (unlike the split ring 348, which is completely recessed within the first spring seat 452). Like the split ring 348, the pin 600 engages the bottom surface 528 of the base portion 512, as illustrated in FIG. 10. Thus, the base portion 512 of the first spring seat 452 is disposed and retained between the first spring 146 and the pin 600, with both the first spring 146 and the pin 600 serving to keep the first spring seat 452 operatively coupled to, and in radial and axial alignment with, the valve stem 106.

Consistent with the foregoing, as a result of this arrangement, when the valve stem 106 is shifted upward along the longitudinal axis A (to, e.g., the second or third position), the pin 600 applies an upward force on the bottom surface 528 and, more generally, the first spring seat 452, driving the first spring seat 452 upward (and causing the first spring 146 to compress against the internal shoulder 156). Conversely, when the valve stem 106 is shifted downward along the longitudinal axis A (e.g., back to the first position), the spring 146, which is seated in the groove 520 against the top surface 536, drives the first spring seat 452 downward along the longitudinal axis A until the base portion 512 again engages the pin 600.

Figure 11:
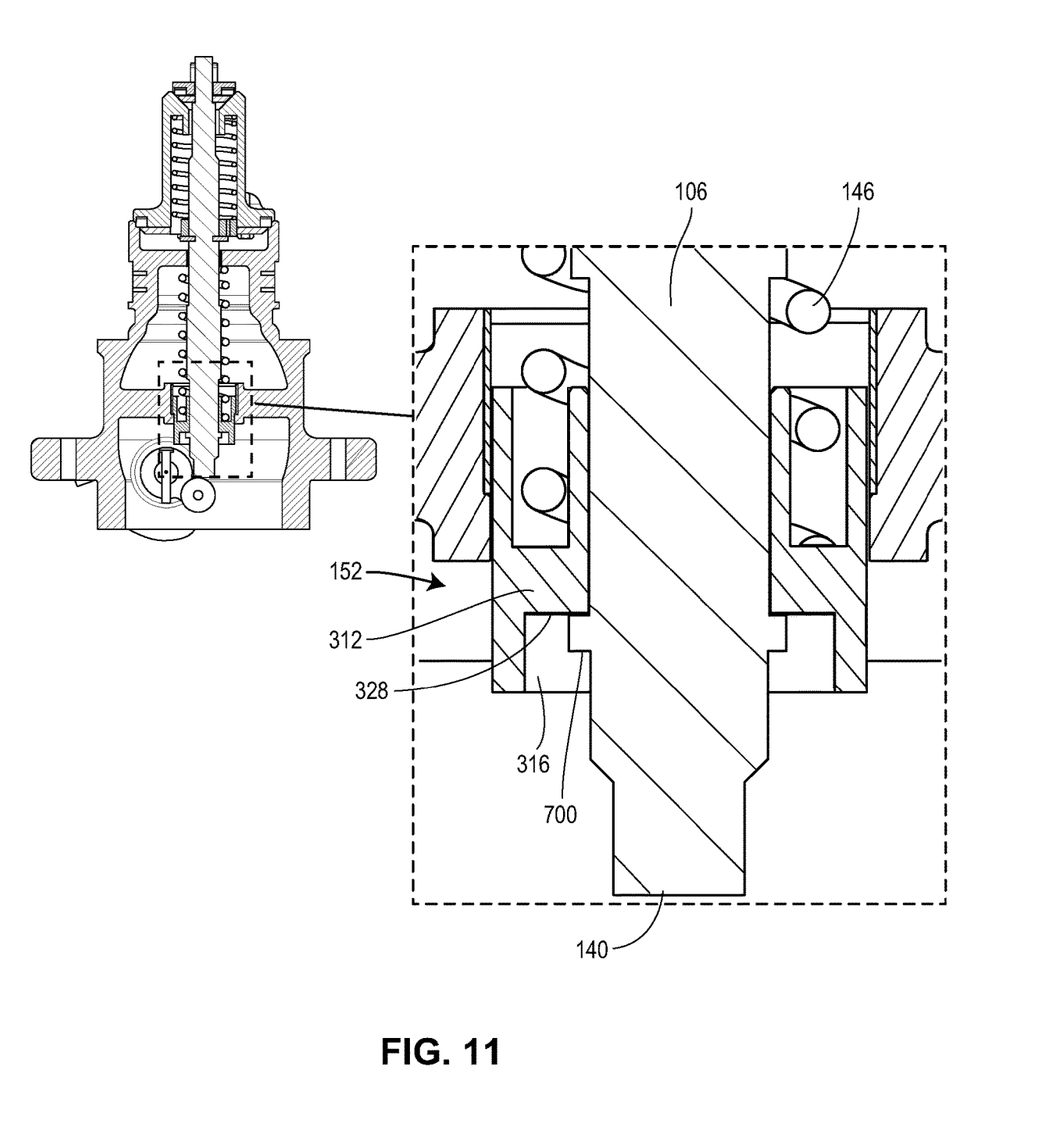
FIG. 11 is similar to FIG. 10, but depicts another example of a retaining feature, constructed according to the teachings of the present disclosure, for operatively coupling the first spring seat to the valve stem.

FIG. 11 illustrates yet another example of a retaining feature 154 that can be used to operatively couple the first spring seat 152 (or the first spring seat 452) to the valve stem 106 (and vice-versa). The retaining feature 154 illustrated in FIG. 11 takes the form of an annular shoulder 700 of the valve stem 106, such that no additional or external retaining element, e.g., the ring 348, the pin 600, is required. The annular shoulder 700 extends outward from and of the valve stem 106 such that the portion of the valve stem 106 including the annular shoulder 700 has a diameter that is greater than a diameter of the portions of the valve stem 106 immediately adjacent the annular shoulder 700. The annular shoulder 700 is formed at a portion of the valve stem 106 that is proximate to the end 140 and positioned under (or downstream of) the base portion 312 of the first spring seat 152, such that the annular shoulder 700 is arranged within the recess 316 and, in turn, completely recessed within the first spring seat 152. Like the split ring 348 and the pin 600, the annular shoulder 700 engages the bottom surface 328 of the base portion 312, as illustrated. Thus, the base portion 312 of the first spring seat 152 is disposed and retained between the first spring 146 and the annular shoulder 700, with both the first spring 146 and the annular shoulder 700 serving to keep the first spring seat 152 operatively coupled to, and in radial and axial alignment with, the valve stem 106.

Consistent with the foregoing, as a result of this arrangement, when the valve stem 106 is shifted upward along the longitudinal axis A (to, e.g., the second or third position), the shoulder 700 applies an upward force on the bottom surface 328 and, more generally, the first spring seat 152, driving the first spring seat 152 upward (and causing the first spring 146 to compress against the inwardly extending portions 156). Conversely, when the valve stem 106 is shifted downward along the longitudinal axis A (e.g., back to the first position), the spring 146, which is seated in the groove 320 against the top surface 336, drives the first spring seat 152 downward along the longitudinal axis A until the base portion 312 again engages the shoulder 700.

It will also be appreciated that the retaining feature 154 used to operatively couple the first spring seat 152 or the first spring seat 452 to the valve stem 106 (and vice-versa) can vary from the split ring 348, the pin 600, and the annular shoulder 700 described and illustrated herein. In other examples, the retaining feature 154 can take the form of, for example, a closed ring (instead of the split, partially open, ring 348), a spring ring, a rivet, a nut, or some other retaining element. It will also be appreciated that the first spring seat

152 and the first spring seat 452, as well as the different retaining features 154 described herein, may be manufactured using additive manufacturing techniques, conventional manufacturing techniques (e.g., casting, powder metallurgy, or machining), or a combination of conventional and additive manufacturing techniques. The first spring seat 152 and the first spring seat 452, as well as the different retaining features 154 described herein, may be manufactured of stainless steel, aluminum, various alloys, one or more other metals, plastic (e.g., an elastomeric material), other suitable materials, or combinations thereof.

The spring seats 152, 452, and the retaining features 154 of the present disclosure provide a number of benefits. First, the spring seats 152, 452, and the retaining features 154 of the present disclosure help to keep the valve stem 106 in proper axial and radial alignment, thereby enhancing the stability of the internal valve 100. Second, because the spring seats 152, 452, are operatively coupled to the valve stem 106 via one of the retaining features 154, without, for example, requiring a threaded connection, the difficulty normally associated with installing a spring seat like the spring seats 152, 452, in the internal valve 100 can be reduced, thereby allowing for improved efficiency.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. An internal valve for connection to a fluid container, the internal valve assembly comprising:
   a valve body having an inlet, an outlet, and defining a main flow path between the inlet and the outlet;
   a poppet valve coupled to the valve body and shiftable between an open position where the inlet of the valve body is open and a closed position where the inlet of the valve body is closed;
   a bleed valve including a bleed valve body having a bore, a bleed inlet, a bleed outlet, and defining a bleed flow path between the bleed inlet and the bleed outlet, the bleed valve arranged to open and close the bleed inlet;
   a valve stem slidably disposed in the valve body and operatively coupled to the bleed valve;
   an actuator operatively coupled to the valve stem and operable to shift the valve stem from a first position in which the poppet valve and the bleed valve are both closed, to a second position in which the bleed valve is open, and a third position in which the bleed valve is closed and the poppet valve is open,
   wherein when the valve stem is in the third position, the poppet valve is arranged to shift toward the closed position and the bleed valve is arranged to open in response to a pressure change;
   a spring seat coupled to the valve stem, the spring seat comprising an annular body defined by an outer wall, a recess partially defined by the outer wall, and an annular groove;
   a retaining feature that engages the spring seat and couples the spring seat to the valve stem such that the spring seat is movably disposed in the valve body; and
   a spring disposed in the main flow path and operatively coupled to the valve stem via the spring seat, the spring configured to bias the valve stem toward the first position, and the spring having one end seated directly against a surface of the spring seat and disposed in the annular groove such that the one end of the spring is surrounded by the outer wall,
   wherein the retaining feature is movably disposed in the recess.

2. The internal valve of claim 1, wherein the retaining feature comprises a ring coupled to the valve stem.

3. The internal valve of claim 2, wherein the ring is seated in the recess formed in the spring seat, thereby retaining the spring seat between the spring and the ring.

4. The internal valve of claim 1, wherein the retaining feature comprises a pin extending through a portion of the valve stem.

5. The internal valve of claim 4, wherein the pin is seated in the recess formed in the spring seat, thereby retaining the spring seat between the spring and the pin.

6. The internal valve of claim 4, wherein the valve stem is shiftable along a longitudinal axis, and wherein the pin is oriented along an axis that is substantially perpendicular to the longitudinal axis.

7. The internal valve of claim 1, wherein the retaining feature comprises an annular shoulder of the valve stem.

8. The internal valve of claim 1, wherein the annular groove is configured to limit horizontal movement of the spring relative to the valve stem.

9. The internal valve of claim 1, further comprising a guide sleeve seated between a portion of the spring seat and the valve body.

10. The internal valve of claim 1, wherein the spring seat has an inlet end and an outlet end, the inlet end facing the inlet of the valve body and the outlet end facing the outlet of the valve body, and wherein the inlet end of the spring seat is disposed immediately adjacent the spring and the retaining feature is disposed immediately adjacent the outlet end of the spring seat.

11. The internal valve of claim 1, wherein the annular body is further defined by an inner wall spaced radially inward of the outer wall, the outer wall arranged to movably engage a portion of the valve body when the valve stem shifts between the first, second, and third positions, and the inner wall defining a central bore sized to receive the valve stem.

12. An internal valve for equalizing a pressure differential between an upstream fluid source and a fluid container, the internal valve comprising:
   a valve body having an inlet, an outlet, and defining a main flow path between the inlet and the outlet;
   a poppet valve arranged to open and close the inlet of the valve body;
   a bleed valve including a bleed valve body having a bore, a bleed inlet, a bleed outlet, and defining a bleed flow path between the bleed inlet and the bleed outlet, the bleed valve arranged to open and close the bleed inlet;
   a valve stem slidably disposed in the valve body and operatively coupled to the bleed valve, the valve stem shiftable from a first position in which the poppet valve and the bleed valve are both closed, to a second position in which the bleed valve is open and the poppet valve is closed, and a third position in which the poppet valve is open and the bleed valve is closed; and a spring seat coupled to the valve stem;

a retaining feature that engages the spring seat and couples the spring seat to the valve stem such that the spring seat is movably disposed in the valve body, the spring seat comprising an annular body defined by an outer wall, an inner wall spaced radially inward of the outer wall, and a base portion that connects the outer wall and the inner wall, the outer wall arranged to movably engage a portion of the valve body when the valve stem shifts between the first, second, and third positions, and the inner wall defining a central bore sized to receive the valve stem, the spring seat further comprising a recess and an annular groove, the recess defined in an outlet end of the annular body by a bottom surface of the base portion, and the annular groove defined in an inlet end of the annular body by a top surface of the base portion opposite the bottom surface; and a spring disposed in the main flow path and operatively coupled to the valve stem via the spring seat, the spring configured to bias the valve stem toward the first position, wherein the retaining feature is at least partially disposed in the recess.

13. The internal valve of claim 12, wherein the retaining feature comprises a ring coupled to the valve stem, and wherein the ring is seated in the recess formed in the spring seat, thereby retaining the spring seat between the spring and the ring.

14. The internal valve of claim 12, wherein the retaining feature comprises a pin extending through a portion of the valve stem, and wherein the pin is seated in the recess formed in the spring seat, thereby retaining the spring seat between the spring and the pin.

15. The internal valve of claim 12, wherein the valve stem is shiftable along a longitudinal axis, and wherein the pin is oriented along an axis that is substantially perpendicular to the longitudinal axis.

16. The internal valve of claim 12, wherein the retaining feature comprises an annular shoulder of the valve stem.

17. The internal valve of claim 12, wherein the annular groove is defined between the outer and inner walls and sized to receive the spring, the annular groove configured to limit horizontal movement of the spring relative to the valve stem.

18. The internal valve of claim 12, further comprising a guide sleeve arranged between a portion of the spring seat and the valve body.

19. The internal valve of claim 12, wherein the inlet end of the annular body faces the inlet of the valve body and the outlet end of the annular body faces the outlet of the valve body, and wherein the inlet end of the annular body is disposed immediately adjacent the spring and the retaining feature is disposed immediately adjacent the outlet end of the annular body.

20. An internal valve for equalizing a pressure differential between an upstream fluid source and a fluid container, the internal valve comprising:

a valve body having an inlet, an outlet, and defining a main flow path between the inlet and the outlet;

a poppet valve arranged to open and close the inlet of the valve body;

a bleed valve including a bleed valve body having a bore, a bleed inlet, a bleed outlet, and defining a bleed flow path between the bleed inlet and the bleed outlet, the bleed valve arranged to open and close the bleed inlet;

a valve stem slidably disposed in the valve body and operatively coupled to the bleed valve, the valve stem shiftable from a first position in which the poppet valve and the bleed valve are both closed, to a second position in which the bleed valve is open and the poppet valve is closed, and a third position in which the poppet valve is open and the bleed valve is closed; and a spring seat coupled to the valve stem;

a retaining feature that engages the spring seat and couples the spring seat to the valve stem such that the spring seat is movably disposed in the valve body, the spring seat comprising an annular body defined by an outer wall, an inner wall spaced radially inward of the outer wall, and a base portion that connects the outer wall and the inner wall, the outer wall arranged to movably engage a portion of the valve body when the valve stem shifts between the first, second, and third positions, and the inner wall defining a central bore sized to receive the valve stem, the spring seat further comprising a recess and an annular groove each formed in the annular body, the recess defined in an outlet end of the annular body between the outer wall and a bottom surface of the base portion, and the annular groove defined in an inlet end of the annular body between the outer wall, the inner wall, and a top surface of the base portion opposite the bottom surface; and a spring disposed in the main flow path and operatively coupled to the valve stem via the spring seat, the spring configured to bias the valve stem toward the first position, wherein the retaining feature is at least partially disposed in the recess and wherein one end of the spring is disposed in the annular groove such that the one end of the spring is surrounded by the outer wall.

\* \* \* \* \*

UNITED STATES PATENT AND TRADEMARK OFFICE
CERTIFICATE OF CORRECTION

PATENT NO. : 10,794,505 B2  
APPLICATION NO. : 15/635904  
DATED : October 6, 2020  
INVENTOR(S) : Li Li et al.

Page 1 of 1

It is certified that error appears in the above-identified patent and that said Letters Patent is hereby corrected as shown below:

On the Title Page

At item (72), Line 3, "Shao Lijing" should be -- Lijing Shao --.

At item (30), Line 2, "2017 2 0235730 U" should be -- 2017 2 0235730 --.

In the Specification

At Column 9, Lines 13-14, "the valve port 200" should be -- the bleed port 200 --.

At Column 9, Lines 15-16, "the valve port 200" should be -- the bleed port 200 --.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*